Nov. 23, 1926.

S. B. BILGER 1,608,160

COMBINED TRUCK AND PIANO LOADER AND CARRIER

Filed June 19, 1923   3 Sheets-Sheet 1

INVENTOR
Samuel B. Bilger
By W. W. Williamson, Atty.

Nov. 23, 1926.

S. B. BILGER 1,608,160

COMBINED TRUCK AND PIANO LOADER AND CARRIER

Filed June 19, 1923  3 Sheets-Sheet 2

INVENTOR
Samuel B. Bilger
By W. W. Williamson, Atty.

Nov. 23, 1926.
S. B. BILGER
1,608,160
COMBINED TRUCK AND PIANO LOADER AND CARRIER
Filed June 19, 1923    3 Sheets-Sheet 3
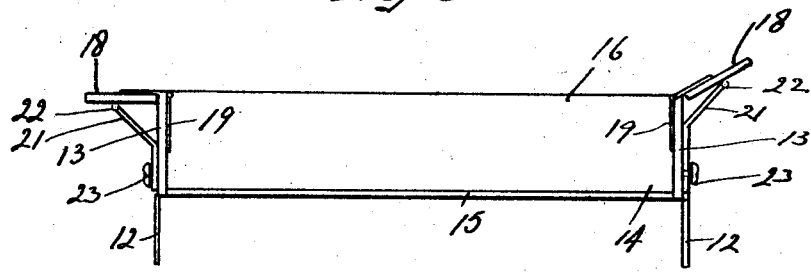
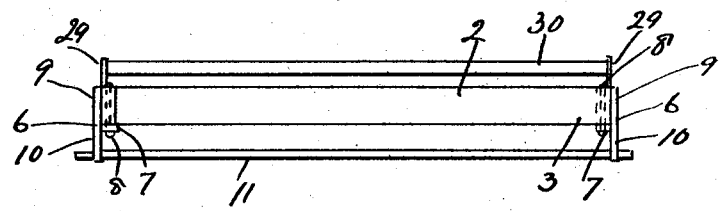
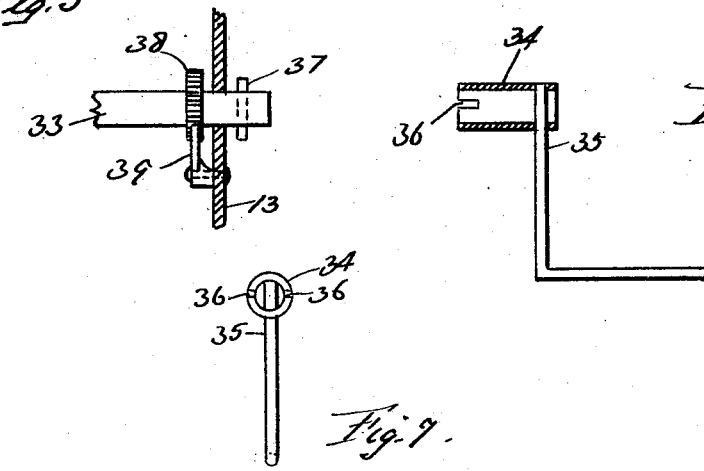
INVENTOR
Samuel B. Bilger
By W. W. Williamson, Atty.

Patented Nov. 23, 1926.

1,603,160

UNITED STATES PATENT OFFICE.

SAMUEL B. BILGER, OF BUCKINGHAM, PENNSYLVANIA, ASSIGNOR OF ONE-HALF TO JOHN D. BURKHOLDER, OF LANCASTER, PENNSYLVANIA.

COMBINED TRUCK AND PIANO LOADER AND CARRIER.

Application filed June 19, 1923. Serial No. 646,312.

My invention relates to a combined truck and piano loader and carrier, and has for its object to provide a simple, effective and durable device of this character that may be used as a light delivery truck or the parts adjusted so as to be used as a piano loader and carrier with which one person can load or unload a piano easily and quickly and transport the same from place to place.

Another object of the invention is to so construct the parts that they may be readily attached to a vehicle to produce a body and form a piano loader and carrier.

A further object of the invention is to arrange the hoisting mechanism in such manner that the operator will be within access of the piano as it is being loaded or unloaded to prevent the piano tilting prematurely.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 3 is a rear end view of the loader and carrier with the tail board removed and one of the side shelves raised and the other lowered.

Fig. 4 is a rear view of the vehicle frame.

Fig. 5 is a fragmentary plan view of the power shaft of the hoist and its component parts.

Fig. 6 is a longitudinal sectional view of the crank; and

Fig. 7 is an end view thereof.

Figure 1:
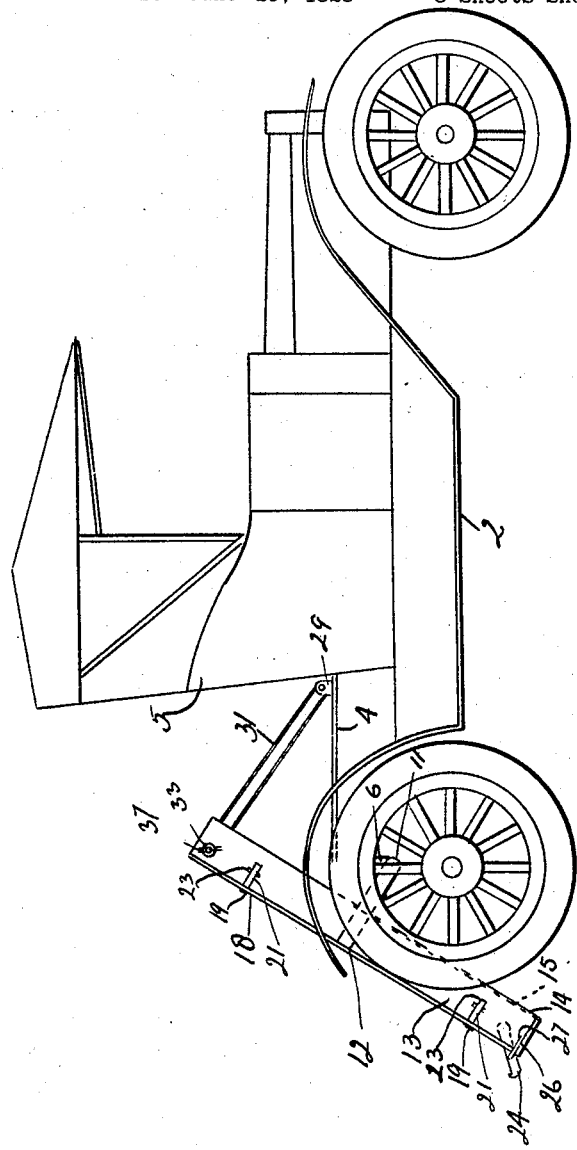
Fig. 1 is a side elevation of a vehicle embodying my invention, the piano loader and carrier being shown in a tilted position.

In carrying out my invention as here embodied, 2 represents a vehicle here shown as an automobile embodying the "Ford roadster" constructions.

The vehicle includes a frame 3 having a floor 4 thereon to the rear of the driver's seat designated by the numeral 5 and to the sides of the frame at the rear ends thereof are secured the T irons 6, the rib 7 of which underlies the frame and has a bolt 8 passing therethrough and through the frame of the vehicle for securing the T iron in place while one of the flanges, as 9, is disposed across the outside surface of the frame with the other flange 10 projecting below said frame. In the depending flanges of the T irons is mounted a rod 11 each end of which projects beyond the said T irons. On said projecting ends of the rod are journalled the uprights 12 secured to the sides 13 of the body 14.

The body consists mainly of the said sides 13, a bottom 15 of less length than the said sides connected therewith at their rear ends and said bottom in conjunction with the floor 4, forms a complete truck body bottom, a panel 16 between the sides adjacent their forward ends and a tail board 17. The body may also be provided with side shelves 18 which are hinged to the sides 13 by means of suitable hinges 19 and the leaves of said hinges which are connected with the side shelves are adapted to enter notches 20 formed in the upper edges of the sides 13 when the shelves are in a lowered position, as shown at the left hand side of Fig. 3, so that when the said shelves are in their lowered positions all parts will be below the upper edges of the sides 13 and when it is desired to maintain said sides in a raised position, as shown at the right hand side of Fig. 3, the brackets 21 which are loosely connected with the shelves by means of suitable fastening devices 22 such as staples are raised the desired height and held in such adjusted position by means of thumb bolts 23 or their equivalent which is screwed into the body sides.

Figure 2:
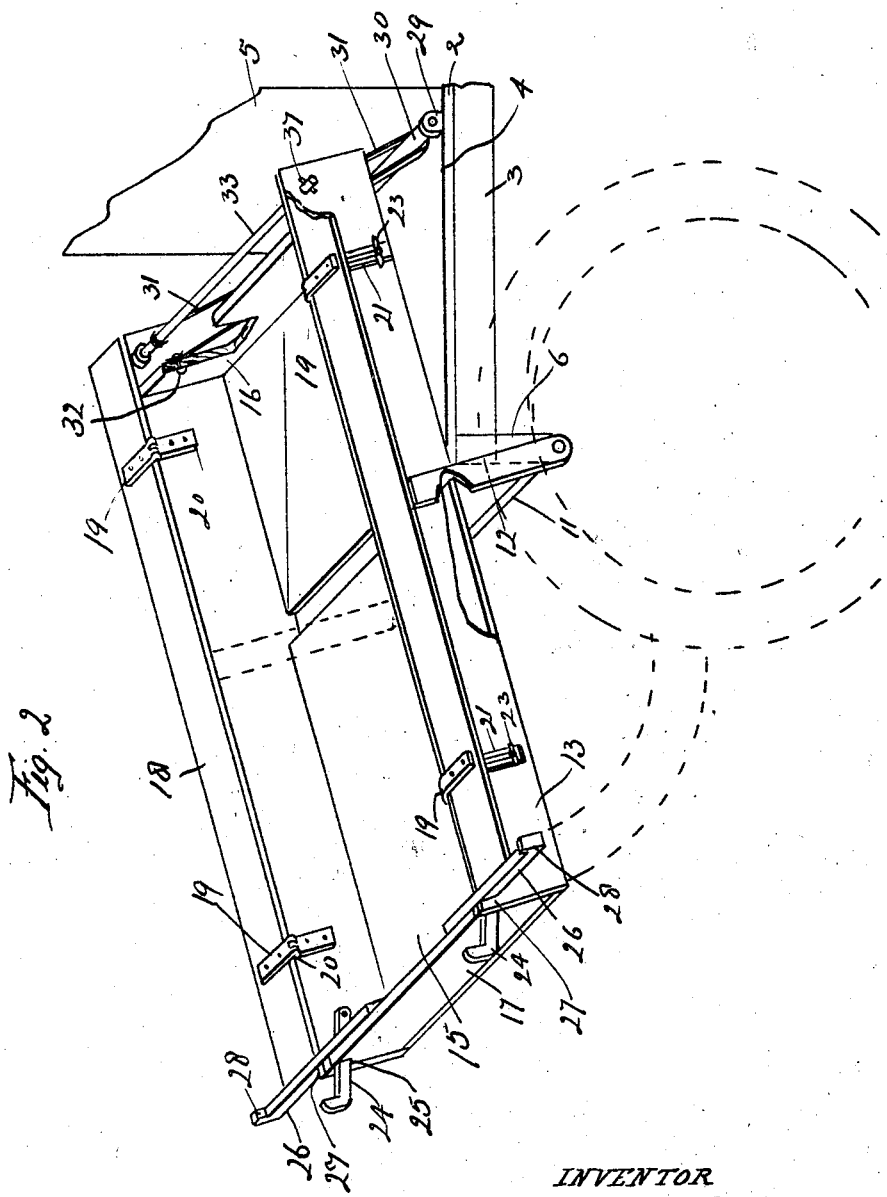
Fig. 2 is an enlarged fragmentary perspective view of the vehicle with the loader and carrier in a different tilted position, portions of the latter being broken away to illustrate certain details of construction.

To the rear end each side 13 of the body and preferably on the inside thereof is pivoted a lifting hook 24 which when in their operative positions project beyond the tail board through slots 25 in the latter and which may be swung back into the body to an inoperative position. To the said tail board 17 are pivoted the side braces 26 so that they may be swung inside of the body or into an operative position, as shown in Fig. 2, and when in the latter position they project through slots 27 in the body sides 13 with their upper edges approximately flush with the upper edges of said body sides and these side braces have hooked ends or are provided with upwardly projecting lugs 28 to engage the side of a piano and prevent the same from moving about while being transported.

To some convenient part of the vehicle adjacent the driver's seat are located suitable bearings 29 in which the ends of the tubular roller 30 are journalled and around this roller passes the straps 31 one end of each being secured to the panel 16 by suitable fastening devices 32 while the other ends of said straps are secured to the tubular shaft 33 about which they are to be wound during the hoisting of the body. Said tubular shaft is suitably journalled and has one end projecting through one of the body sides 13 for the reception of the socket 34 of the crank 35, said socket being of such size as to readily slip over the projecting end of the shaft and having notches 36 to register with the projecting ends of the pin 37 passing through that portion of the shaft on the outside of the body. On the shaft adjacent the end which projects through the body preferably on the inside of said body is mounted a ratchet wheel 38 with which coacts a pawl 39 to prevent retrograde movement of the parts during the hoisting operations.

From the foregoing description it will be seen that a two in one body is provided which is strong and neat in design with hinged shelvings that will set up or lay flat while the lifting hooks and side braces which swing inside out of the way when not in use eliminate the necessity of tying or otherwise fastening the piano to the loader. The side braces maintain the piano in proper alignment upon the loader and prevent it from slipping sidewise during transportation, while the lifting hooks prevent the piano from sliding while being raised or lowered and also prevent the same from sliding rearwardly during transit. The winding shaft of the hoisting mechanism being on the body itself is a great advantage as the operator is always within easy access of the piano to prevent the same from tilting prematurely particularly at the time the piano is being unloaded, it being possible for the operator to support the piano just at the time the rear end of the loader is reaching the ground.

In practice the body is tilted until the rear end is slightly lower than as shown in Fig. 1 or until the lifting hooks are below the bottom edge of the piano when setting upon its own casters or upon a piano truck then by either moving the piano or backing the vehicle the lifting hooks will underlie the bottom of said piano. When the piano is in such relation to the loader it is tilted backward until resting upon the upper edges of the sides 13 and then by actuating the hoisting mechanism the body will be moved into a horizontal position with the piano thereon bringing the top of said piano into close proximity to the driver's seat but as the pawl and ratchet are in engagement no retrograde movement can take place and it is therefore unnecessary to fasten the parts in any other way. As there are two straps used in the hoisting mechanism one arranged adjacent each side of the body tension on said body is evenly distributed preventing any undue strain on the parts. By reversing the operations hereinbefore set forth the piano may be readily and easily unloaded.

When the body is in a raised or horizontal position the bottom 15 will align endwise with the floor permitting the device to be used as a light delivery truck and even during the transportation of a piano small objects such as boxes of accessories may be placed upon the floor 4 and transported at the same time.

Of course I do not wish to be limited to the exact details of construction as herein shown as these may be varied within the limits of the appended claims without departing from the spirit of my invention.

Having thus fully described my invention, what I claim as new and useful is:—

1. A combined truck and piano loader and carrier consisting of a vehicle having a floor, a body journalled to the rear end of said vehicle and having a bottom only at the rear end adapted to align endwise with the floor when the body is in a raised position, and means to hoist said body to a raised position.

2. The combination with a vehicle frame, of a body pivoted intermediate its ends to the rear end of the vehicle frame, lifting hooks pivoted to the sides of the body so as to be swung entirely within the body or their hooked ends positioned outside the rear of the body, and hooked side braces pivoted to the rear end of the body so as to be swung outside of the body sides or entirely within the body.

3. The combination with a vehicle frame, of a body pivoted intermediate its ends to the rear end of the vehicle frame, lifting hooks pivoted to the inner surfaces of the body sides whereby they may be swung outside of the rear end, and hooked side braces pivoted to the iner surface of the rear end whereby they may be swung outside of the body sides and beyond the edges of the shelves, said side braces coacting with the lifting hooks to hold the latter outward.

In testimony whereof I have hereunto affixed my signature.

SAMUEL B. BILGER.